(No Model.) 3 Sheets—Sheet 1.
J. P. NUGENT.
PLANTER ATTACHMENT FOR PLOWS.
No. 481,242. Patented Aug. 23, 1892.
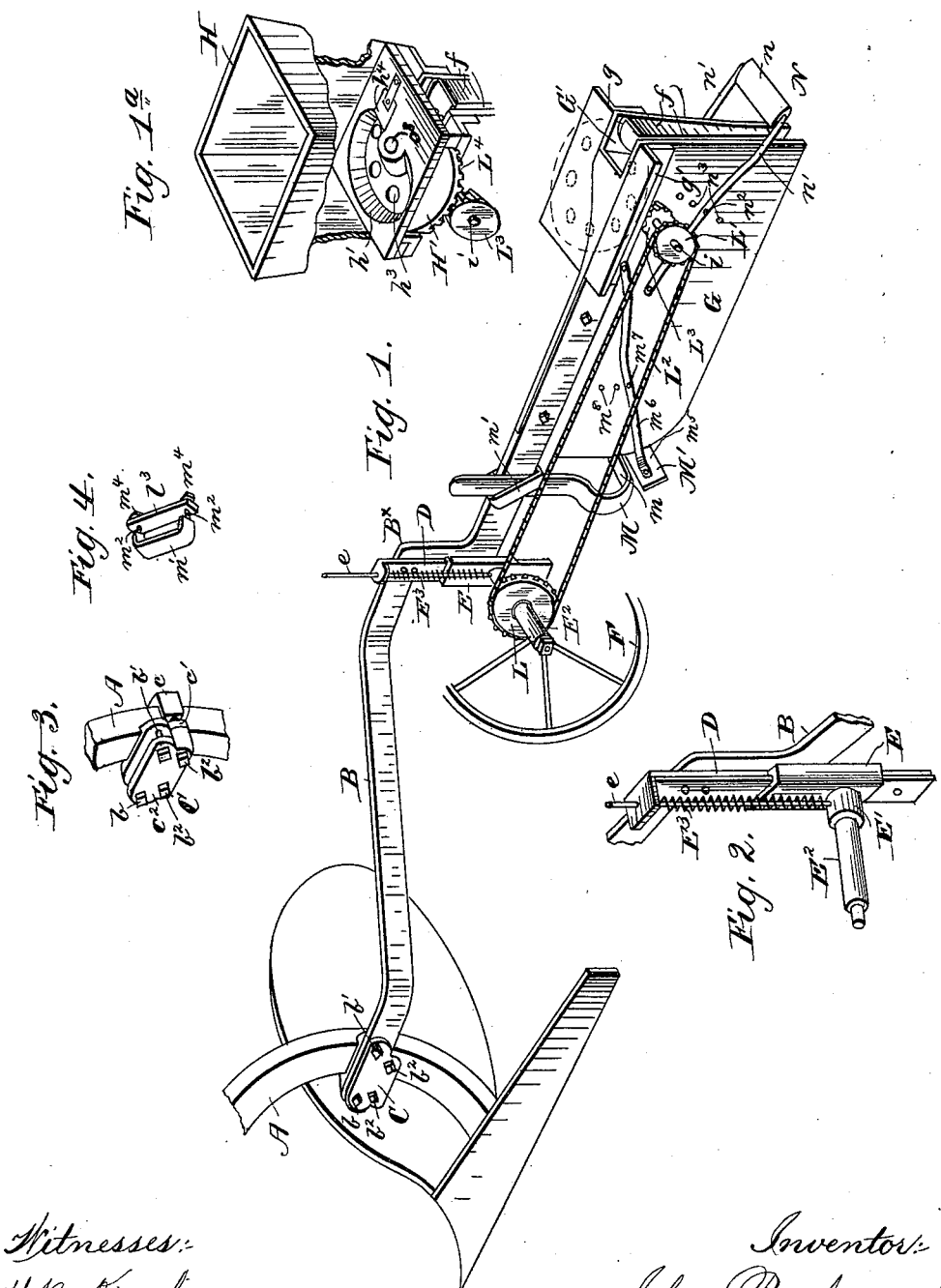
Witnesses:
H. B. Kingsbury
O. H. Northup
Inventor:
John P. Nugent,
by William E. Poulter,
attorney (No Model.) 3 Sheets—Sheet 2.
J. P. NUGENT.
PLANTER ATTACHMENT FOR PLOWS.
No. 481,242. Patented Aug. 23, 1892.
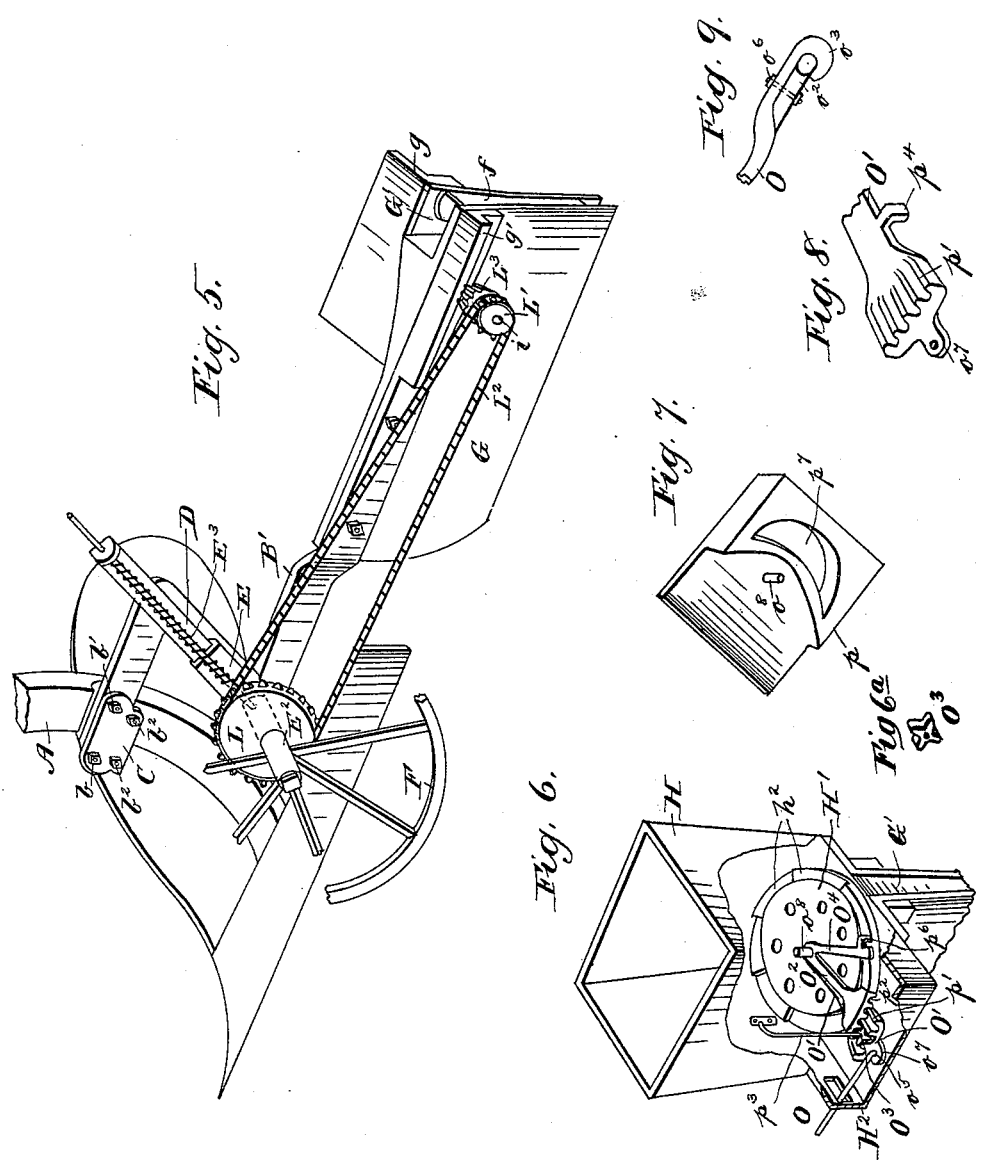

(No Model.) 3 Sheets—Sheet 3.
J. P. NUGENT.
PLANTER ATTACHMENT FOR PLOWS.
No. 481,242. Patented Aug. 23, 1892.
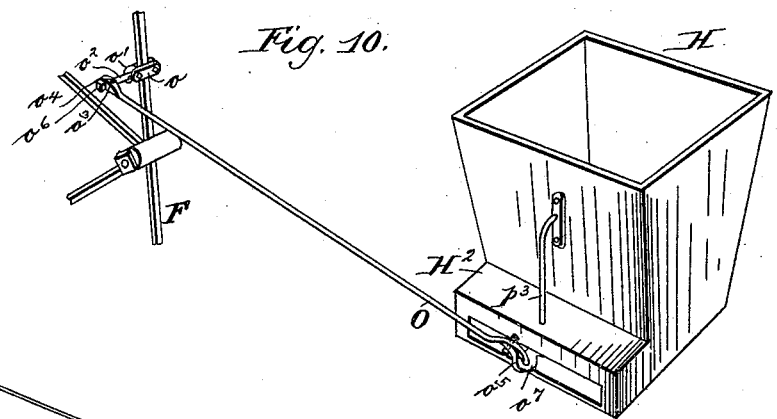
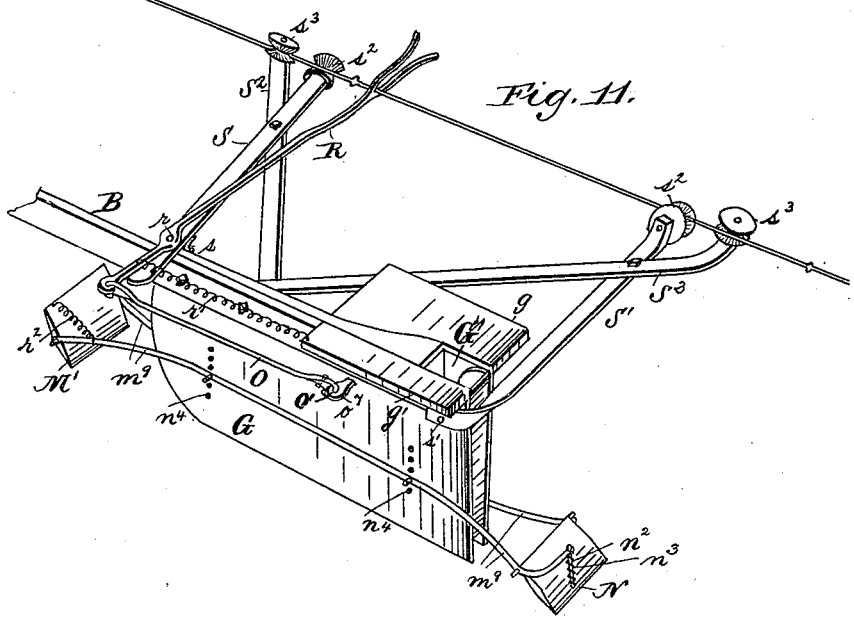
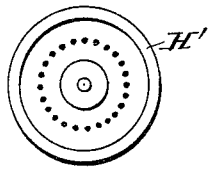
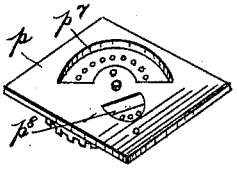
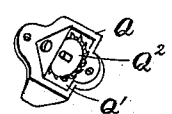
Witnesses:
H. B. Kingsbery
C. C. Moukup
Inventor:
John P. Nugent,
by William E. Coulter,
attorney

UNITED STATES PATENT OFFICE.

JOHN P. NUGENT, OF DUBUQUE, IOWA.

PLANTER ATTACHMENT FOR PLOWS.

SPECIFICATION forming part of Letters Patent No. 481,242, dated August 23, 1892.

Application filed April 16, 1891. Serial No. 389,142. (No model.)

*To all whom it may concern:*

Be it known that I, JOHN P. NUGENT, a citizen of the United States, residing at Dubuque, in the county of Dubuque and State of Iowa, have invented certain new and useful Improvements in Planter Attachments for Plows; and I do hereby declare the following to be a full, clear, and exact description of the invention, such as will enable others skilled in the art to which it appertains to make and use the same.

My invention has relation to planter attachments for sulky or gang plows and is adapted for planting various kinds of seeds in either old or new ground; and among the objects in view are to provide a planter attachment which can be readily attached to or disconnected from a plow-beam and which is of comparatively simple and inexpensive construction and capable of performing the purposes aimed at in a very efficacious manner and with the above and certain other objects in view.

The invention consists in the construction, arrangement, and combination of parts constituting my improved planter attachment, as will be hereinafter fully described, illustrated in the accompanying drawings, and pointed out in the appended clauses of claim.

In said drawings, Figure 1 is a perspective view of a plow provided with my improved planter attachment, the seed-box of the latter being removed; Fig. 1ª, a perspective view of the seed-box detached and partly broken away to show plainly the interior parts. Fig. 2 is a perspective view of a portion of the planter-beam, the wheel-axle, and the sliding support for the latter. Fig. 3 is a perspective detail view of the clevis or devices for connecting the planter attachment to the plow-beam; Fig. 4, a like view of the devices for connecting the cutter or colter for breaking the clods of earth with the planter-beam. Fig. 5 is a perspective view of a plow provided with a modified construction of my planter attachment, the seed-box being removed. Fig. 6 is a perspective detail view showing a different construction of seed-box and different devices for operating the seed-plate from the traction-wheel. Fig. 6ª is a detail perspective view of the fluted roller $O^3$. Fig. 7 is a perspective detail view of the plate $p$. Fig. 8 is a like view of a portion of the arm, to which is connected one end of the rod, whose other end is connected with one of the wheel-spokes; Fig. 9, a like view of a portion of the arm O, showing the devices for connecting the same with the wheel-spoke. Fig. 10 is a perspective view of the seed-box and the devices for operating the seed-plate from the traction-wheel. Fig. 11 is a detail perspective view showing a check-row attachment applied to the planter, and also showing a modification in the means for supporting and adjusting the hoes M' N; Fig. 12, a plan view of a seed-plate used when planting very small seed; Fig. 13, a detail perspective view of the plate $p$, adapted to be arranged above the seed-plate shown in Fig. 12. Fig. 14 is a detail perspective view of the casting containing a toothed wheel for forcing the seed through the seed-openings.

Referring to the above drawings, and more particularly to Figs. 1 to 5, inclusive, A indicates an ordinary plow-beam, to which is to be attached my improved planter attachment. B indicates the beam of the latter, which is of the shape shown in Fig. 1, so that when its forward end is attached to the plow-beam it will diverge laterally therefrom, for a purpose presently explained.

For the purpose of readily attaching and disconnecting the planter from the plow-beam I may provide any suitable means; but those which I prefer to employ consist of a clevis C, composed of the three plates $c$ $c'$ $c^2$. Between the plates $c$ and $c'$ is confined the beam A, while between the plate $c^2$ and that $c'$ is confined the beam B of the planter, said beam B being pivotally mounted at its forward end upon a bolt $b$, passing through the plates $c'$ and $c^2$, through which beam also passes a bolt $b'$.

By removing the bolts $b$ $b'$ the planter can be detached from the plow-beam in a very quick and simple manner. Bolts $b^2$, passing through the plates $c'$ $c^2$ and screwing into the plate $c$, serve to secure the clevis to the plow-beam.

To the beam B, at about the point $B^\times$ thereof, is bolted the standard D, whose edges are rabbeted and upon which standard is fitted and adapted to slide an angular plate E, provided with a tubular boss or sleeve E', within which fits and is adapted to revolve a short shaft $E^2$ or axle, which carries at its outer end a traction-wheel F. By this means the wheel is allowed free vertical movement when the same passes over rough ground or meets an obstruction, and for the purpose of maintaining said wheel in contact with the ground at all times, and thus preserve the regular planting of the seed, I provide a coiled spring $E^3$, encircling a rod $e$, secured to the sleeve $E'$, and passing upwardly through the lip or bent upper end of the standard D.

To the rear portion of the beam B is secured the vertically-arranged plate or furrow-opener G, whose rear end is provided with a chamber $G'$, formed by the depending sides $f$, secured to the plate G in any suitable manner. Upon this plate G, with its flange $g$ and the flange $g'$ secured to the beam B, is adapted to rest and be secured the seed-box H. The seed-box, which may be of rectangular or other shape and of any desired capacity, has its bottom cut away, as shown at $h'$, and mounted upon the central bolt or pivot $h^2$ beneath the said bottom $h$ and adapted to revolve thereon is the seed plate or disk $H'$. The latter is provided circumferentially with a number of openings $h^3$, which, when the plate is revolved, are adapted to successively pass beneath the opening $h'$ in the bottom of the seed-box and over the upper end of chamber $G'$. By using different plates or disks with different-sized openings a greater or less quantity of seed will be deposited and at shorter or longer intervals. A spring $h^4$, pressing upon the upper face of plate $H'$, may be provided, which will tend to keep the said plate from contact with the under surface of the bottom of the seed-box, and thus prevent crushing or bruising of the seed and serve also as a cut-off.

For the purpose of operating the seed plate or disk when the planter is being drawn over the ground I provide the following devices: L indicates a sprocket-wheel mounted rigidly upon the axle or shaft $E^2$ intermediate the wheel F and its sliding support D. Upon a short shaft or stud $i$, mounted in the plate G, is secured a sprocket-wheel $L'$, over which and the sprocket-wheel L passes a sprocket-chain $L^2$. Also mounted upon the stud $i$ or formed integral with the sprocket $L'$ is a bevel gear-wheel $L^3$, which meshes with teeth $L^4$, formed upon the under side of the seed-plate $H'$. It will thus be seen that by the above-described devices when the planter is drawn along the ground the seed-plate will be caused to revolve and at a speed corresponding to that at which the planter is moved, and thus cause the openings $h^3$ to successively deposit the seed carried around therein into the chamber $G'$, which fall therethrough into the furrow at regular intervals.

M indicates a cutter or colter for breaking the clods of earth, consisting of a plate bent to form the horizontal or cutter portion $m$, said cutter being adjustably secured to the beam B in front of the blade or furrow-opener G by means of the bail $m'$, embracing the beam B and provided with the threaded lugs $m^2$, over which lugs is loosely passed the plate $l^3$ on the opposite side of the beam. As shown, the upper end of the cutter is passed between the beam and the bail, and by means of the nuts $m^4$, screwing upon the lugs $m^2$, said cutter may be rigidly secured in place or loosened to permit of the same being adjusted, as will be readily understood.

$M'$ indicates a hoe adapted for smoothing the broken clods, said hoe consisting of the plate $m^5$, arranged intermediate the cutter M and the plate G and transversely of the latter, said plate being secured to the end of a rod $m^6$, which passes rearwardly and is adjustably secured to the plate G by means of a bolt $m^7$, which is adapted to be passed through any one of a series of holes $m^8$, formed in the plate.

N indicates a hoe for covering the seed, which has been deposited in the furrow, said hoe consisting of the blade $n$, arranged in a nearly-horizontal position in rear of the plate G and transversely thereof and adapted for adjustment by means of arms $n'$, which are secured to the plate G by bolts $n^2$, adapted to pass through any one of a series of holes $n^3$ in said plate.

The above-described construction of planter attachment is adapted for use in old ground, and when attached to the plow-beam the parts occupy the following positions: The plate G plants into the ground or furrow that has been turned, the traction-wheel runs in the last furrow, and the landside turns a new furrow to the left of the wheel.

In Fig. 5 I have shown a slightly-modified construction of my planter attachment more especially designed for planting in new ground, and in this construction I substitute for the beam B, before described, the beam $B'$, of the shape shown, so that when the planter is attached to the plow-beam the seed will be deposited in the ground before the latter is turned over by the plow and at any required depth and at a short distance—say about one and one-half inches—from the furrow. For instance, in planting four inches deep a farmer can gage his planter to deposit three inches deep, and the next round he turns it over, and the seed will be one inch below the surface and will be safe from the ravages of insects, birds, &c. When planting in new ground, the cutter, smoothing and covering hoes are dispensed with. It will thus be seen that by employing two beams, which can be interchangeably secured to the plow-beam, and by making the standard D removable the latter and parts connected therewith can be readily removed from one of the beams and applied to the other beam, as seen in Fig. 5, and thus I provide, practically, two planters adapted for planting in both old and new ground with equal facility. When the standard and sliding axle-support are applied to the beam B', they will occupy a slightly-oblique position; but this will not interfere with the proper working of the spring to maintain the wheel in contact with the ground.

Instead of employing the construction of seed-box and the means for operating the seed-plate before described, I may employ the seed-box shown in Figs. 6 to 10 and also employ the means shown in said figures for operating the seed-plate. This construction of seed-box and means for operating the seed-plate I will now describe: To one of the spokes of the wheel F is adjustably secured a clevis or clip $o$, provided with a hook $o'$, which embraces an outstanding rod or bolt $o^2$, which at its outer end is embraced by a hook $o^3$, formed on one end of a rod O and pivoted thereto by means of a bolt $o^4$, the outer end of bolt $o^2$ having a head $o^6$. By this arrangement the rod O is permitted to have a slight horizontal vibration or play upon the bolt $o^4$, and at the same time the rod $o^2$ is free to turn within the hook $o'$ when the wheel revolves. The opposite end of rod O is also hooked, as shown at $o^5$, and engages the end $o^7$ of a horizontally-arranged arm O', said end projecting through an opening formed in an extension $H^2$ of the seed-box. The arm O' passes into the seed-box and is pivoted upon a pivot $o^8$, projecting from the bottom of the plate $p$, presently described, and said seed-box is, like the seed-box shown in Figs. 1 to 5, arranged upon the plate G over the chamber G' thereof. The upper face of the arm O' at its outer end is provided with teeth or cogs $p'$, and above the said arm and pivoted also upon the pivot $o^8$ is a second arm $O^2$, whose under face near its outer end is provided with cogs or teeth $p^2$, and located intermediate the said arms O' $O^2$ and meshing with the teeth thereof is a fluted roller or wheel $O^3$, pivotally supported at the lower end of a rod $p^3$, whose other end is to be secured to a side of the seed-box.

The seed-plate H' is arranged upon the bottom of the seed-box and is journaled upon the pivot $o^8$ below the arm O', and is provided with a series of circumferentially-arranged teeth $h^2$ upon its upper side, with which is adapted to engage a dog $p^4$, projecting downwardly from the arm O' in rear of the teeth $p'$, and a dog $p^6$, carried at the outer end of an arm $O^4$, formed integral with the arm $O^2$. The plate $p$, carrying the pivot $o^8$, is located within the seed-box and over the the arms O' $O^2$ $O^2$ $O^4$, and is provided with the cut-away portion or opening $p^7$ to expose several of the holes formed in the seed-plate below to allow of the seed falling into said openings or holes. The bottom of the seed-box should of course be provided with an opening over the chamber G' to permit the seed to fall from the holes in the seed-plate into said chamber, and thence to the ground.

In operation when the traction-wheel revolves the rod O draws the arm O' in one direction—say to the left in Fig. 6. This causes the dog $p^4$ to engage one of the teeth $h^2$ of the seed-plate and revolve the same a distance of one of such teeth. During this time the teeth $p'$ operate the fluted roller $O^3$, which latter causes the arm $O^2$ to be moved in a direction opposite to that of arm O'—i. e., to the right—the dog $p^6$ riding over the teeth of the seed-plate and into a position to engage one of said teeth when the arm O' reaches its extreme movement to the left. The traction-wheel continuing to revolve, the rod O causes the arm O' to be moved to the right, and through the media of the cog-teeth and fluted roller the arm $O^2$ will be moved to the left, its dog $p^6$ engaging the teeth $p^2$ of the seed-plate and revolving it a distance of one tooth, during which time the dog $p^4$ of arm O' rides over the upper face of the teeth of the said plate. Thus the seed-plate is rotated always in one direction and continuously as long as the planter is drawn along and causing the seed to be deposited at regular intervals.

Instead of using the precise means and arrangement thereof for imparting rotation to the seed-plate, modifications may be made therein which will fall within the scope of my invention.

In Fig. 11 I have shown a check-row attachment applied to my planter, thus dispensing with the traction-wheel and standard D and operating the seed-plate from the check-wire. In said figure I also show a modification in the means for supporting and adjusting the cutter M and hoe N.

When applying the check-row attachment, I prefer to attach the same to the beam B, before described. Arms S S' are secured at one end to plate G, as shown at $s$ $s'$, respectively, the outer ends of said arms carrying pulleys $s^2$, as shown, which guide and direct the check-wire. Arms $S^2$ $S^3$ are secured to the plate G, preferably by means of the same bolt, which secures said plate to the beam B. The outer ends of said arms $S^2$ $S^3$ also carry pulleys $s^3$, which guide and direct the check-wire. A check-rod R is pivoted at $r$ to the plate G, through the outer forked end of which passes the check-wire and whose inner end is engaged by one end of rod O, whose opposite end engages the end $o^7$ of arm O', before described. By this arrangement when the knot or bead on the check-wire strikes the fork of rod R the seed-plate will be given a partial rotation, thus causing the seed to be deposited into chamber G'. A spring $r'$ is employed for returning the check-rod into its normal position when the bead on the check-wire leaves the fork of said rod. The smoothing-hoe M' and hoe N are here shown pivoted upon opposite ends of rods $m^9$, through which rods pass bolts, which are adapted to enter any of a series of holes $n^4$ in the plate G, and thus serve to adjustably secure said hoes to the planter. A spring $r^2$, secured at opposite ends to the hoe M' and one of the rods $m^9$, serves to maintain the said hoe in its proper position, while a spring $n^3$, encircling a rod $n^2$, secured at its ends to the hoe N and bent end of one of the rods $m^9$, serves a like purpose for the hoe N.

In Figs. 12, 13, and 14 I have shown a construction of seed-plate, covering-plate, and devices for forcing the seed through the seed-openings in the seed-plate, said construction being adapted for use more especially when planting very fine seed, as onion-seed. The seed-openings are very small and closely arranged. Over this seed-plate is adapted to be arranged a plate $p$, having the cut-away portions $p^7$ $p^8$. Over the latter opening is adapted to be arranged and secured a casting Q, in the chamber $Q'$ of which is journaled a toothed wheel $Q^2$, the teeth being adapted to project into the cut-away portion $p^8$ of plate $p$ and into seed-openings in the seed-plate, whereby as the latter is revolved said teeth will force the seed through the seed-openings into the chamber $G'$.

By my improvements considerable time is saved in plowing and planting, and the planting is done while the ground is in a moist condition, causing the seed to quickly germinate, and thus my attachment is especially adapted for use in dry climates or during a dry season.

Having described my invention, what I claim is—

1. In a planter attachment, the combination, with a planter-beam, of the standard D, provided with the lip or bent upper end, the sliding plate E, mounted upon the standard and having the sleeve $E'$, a coiled spring located intermediate the latter and the said lip and encircling the rod $e$, and the traction-wheel shaft mounted in the sleeve and carrying the traction-wheel, as and for the purpose specified.

2. In a planter attachment, the combination, with the plow-beam, of a planter-beam secured at one end thereto, a ground-wheel carried by said planter-beam, the furrow-opener secured to the planter-beam in rear of the ground-wheel and provided at its rear end with a chamber, as described, the flanges on said furrow-opener, the seed-box supported on said flanges above the chamber and having a slotted bottom, a revoluble seed-plate having seed-openings adapted to register with the opening in the bottom of the seed-box, and suitable devices for turning the said seed-plate, as and for the purpose specified.

3. In a planter attachment, the combination, with the plow-beam, of a planter-beam secured thereto, a ground-wheel carried by said planter-beam, the furrow-opener secured to the planter-beam in rear of the ground-wheel and provided at its rear end with the chamber described, the flanges on said furrow-opener, a seed-box supported on said flanges above the chamber and having a slotted bottom, a revoluble seed-plate having seed-openings adapted to register with the opening in the bottom of the seed-box, suitable devices for turning said seed-plate, and hoes $M'$ N, carried by the furrow-opener and occupying positions respectively in front and in rear of the same, as described, for the purpose specified.

4. The combination, with the planter-beam, of a ground-wheel supported thereby, the furrow-opener secured to the beam in rear of the ground-wheel and provided at its rear end with a chamber $G'$, a seed-box mounted upon the furrow-opener above the chamber, a seed-plate revolubly mounted within the seed-box and having seed-openings and teeth $h^2$, as described, a horizontally-arranged vibrating arm provided with a dog engaging the teeth of the seed-plate, a second vibrating arm arranged above the other arm and provided with a dog engaging with the teeth of the seed-plate, gearing between the said arms for vibrating them simultaneously in opposite directions, and a rod secured at one end to the ground-wheel and at the other end to the lower arm, for the purpose specified.

5. The combination, with the planter-beam, of a ground-wheel supported thereby, the furrow-opener secured to the beam in rear of the ground-wheel and provided at its rear end with a chamber, as $G'$, a seed-box mounted upon the furrow-opener above the chamber, a seed-plate revolubly mounted within the seed-box and having seed-openings and teeth $h^2$, a horizontally-arranged vibrating arm provided with a dog engaging with the teeth of the seed-plate and having a fluted upper face, a second vibrating arm arranged above the other arm and provided with a dog, also engaging with the teeth of the seed-plate and having a fluted lower face, and a fluted roller located intermediate the fluted portions of the arms and engaging the same, whereby said arms may be vibrated simultaneously in opposite directions, for the purpose specified.

6. In a planter attachment, the combination, with the planter-beam provided with the plate G, of the hoes $M'$ and N, the rods $m^9$, to the ends of which are pivotally secured the said hoes and springs secured to the rods $m^9$ and the hoes, openings in the plate G, and bolts passing through the rods and entering said openings, as and for the purpose specified.

7. In a planter attachment, the combination, with the planter-beam, of the vertically-arranged furrow opener G, the colter M, adjustably secured to said beam in front of the furrow-opener, the smoothing-hoe adjustably carried by the furrow-opener and occupying a position intermediate the forward end of the same and the colter, and the covering-hoe, also adjustably carried by the furrow-opener and occupying a position in rear of the same, all arranged for co-operation, substantially as described.

8. In a planter attachment, the combination, with the planter-beam, of a traction-wheel carried thereby, a vertically-arranged blade secured to said beam in rear of the traction-wheel and provided with a chamber, as described, a seed-box mounted upon said blade and provided with a revoluble seed-plate having opening adapted to coincide with said chamber when the plate is revolved, and means located intermediate the traction-wheel and the seed-plate for imparting rotation to the latter from the traction-wheel, as and for the purpose specified.

9. In a planter attachment, the combination, with the planter-beam provided with a plate G, of the hoes M' N, pivotally secured to the ends of the rods $m^9$, openings in said plate G, and bolts passing through said arms or rods $m^9$ into said openings, as and for the purpose specified.

In testimony whereof I affix my signature in presence of two witnesses.

JOHN P. NUGENT.

Witnesses:
   ALEX. SIMPLOT,
   JAMES PLAISTER.